(12) United States Patent
Haraway (10) Patent No.: US 7,128,104 B1
(45) Date of Patent: Oct. 31, 2006

(54) RECEIVING PIT DUST CONTROL DEVICE AND METHOD OF USE

(76) Inventor: Coy N. Haraway, 8501 Macon Rd., Cordova, TN (US) 38018

( * ) Notice: Subject to any disclaimer, the term of this patent is extended or adjusted under 35 U.S.C. 154(b) by 40 days.

(21) Appl. No.: 11/006,036

(22) Filed: Dec. 7, 2004

Related U.S. Application Data

(60) Provisional application No. 60/528,125, filed on Dec. 9, 2003.

(51) Int. Cl.
*B65B 1/04* (2006.01)

(52) U.S. Cl. .................. 141/286; 49/74.1; 49/77.1; 141/83; 141/192; 414/291

(58) Field of Classification Search .............. 141/2, 141/18, 83, 192, 286; 49/51, 74.1, 77.1; 414/291, 292, 303, 376, 572
See application file for complete search history.

(56) References Cited

U.S. PATENT DOCUMENTS

| 4,942,911 A | * | 7/1990 | Herbet .................. 141/359 |
| 5,544,686 A | | 8/1996 | Kearney |
| 5,893,399 A | | 4/1999 | Kearney |
| 6,050,767 A | | 4/2000 | Gay et al. |
| 6,085,987 A | | 7/2000 | Haraway |
| 6,156,087 A | | 12/2000 | Hydes |
| 6,174,121 B1 | | 1/2001 | Davies |
| 6,471,100 B1 | | 10/2002 | Ellsworth |

* cited by examiner

*Primary Examiner*—Timothy L. Maust
(74) *Attorney, Agent, or Firm*—Wood, Herron & Evans, LLP (57) ABSTRACT

A receiving pit has a grid covering an uppermost opening through which grain or other material is deposited into the pit. The grid including a series of generally parallel and spaced bars and a dust control device according to this invention includes a number of flights each adapted to be positioned beneath the grid. The dust control device includes a number of generally vertically extending bulkheads each adapted to be positioned beneath the grid and juxtaposed to a free end of one of the flights to thereby inhibit the escape of dust from the receiving pit. Each flight includes a series of blades capable of independently deflecting in response to an amount of material deposited through the grid and onto the blade. The dust control device also includes a release mechanism coupled to each of the flights to manually deflect at least selected blades and allow material remaining atop the blade to fall into the receiving pit.

21 Claims, 7 Drawing Sheets

RECEIVING PIT DUST CONTROL DEVICE AND METHOD OF USE

This claims the benefit of U.S. provisional patent application Ser. No. 60/528,125, filed Dec. 9, 2003 and hereby incorporated by reference in its entirety.

BACKGROUND OF THE INVENTION

This invention relates to mechanisms designed to reduce the amount of dust emitted from a receiving pit when grain or other material from a truck or rail car is dumped into the receiving pit.

Receiving pits are commonly used to receive grain or other material dumped from a truck, rail car or other vehicle. These receiving pits typically include a grate which forms a covering over the top opening of the receiving pit. The vehicle is driven onto the grate such that the outlet of the vehicle is positioned over the grate, and the contents of the vehicle are emptied from the vehicle through the outlet. The grain or other material being dumped from the vehicle falls through the grate and into the receiving pit. The failing material tends to generate a large amount of dust as it falls through the grate and into the pit. This dust tends to rush up through the grate and into the atmosphere as the falling grain/material displaces the air and dust within the pit.

Several known devices have been directed at reducing or eliminating the dust exiting the receiving pit. One such mechanism designed to reduce emissions of dust from receiving pits includes a number of vents positioned across the opening at the top of the receiving pit. These mechanisms may include blower fans which suck air and dust from the receiving pit in large quantities and direct the air and dust through a filter. The filter blocks the dust particles from passing into the atmosphere. Such devices prevent a portion of the dust from entering the atmosphere. Known devices tend to be expensive and not to function well when the filters become clogged, at which time the dust tends to progress upwardly through the vents and into the atmosphere. The filters and blower fans have the further disadvantage of requiring an undesirable amount of maintenance.

Also, known devices tend not to function in an acceptable manner when material is dumped into the pit at relatively large flow rates. When grain or other material is dumped from a vehicle through a small outlet door in the vehicle, the flow rate of grain being dumped is relatively low. Since the flow rate is low, the rate at which air is being displaced from the receiving pit by the flow of dumped grain is also relatively low. The blower fans have large enough capacity to suck off the air and dust being displaced by the relatively small inflow of grain. But with relatively large flow rates of grain or other material, the rate at which air and dust are displaced by the inflow of material correspondingly increases, and many prior art blower mechanisms are not large enough to accept such large rates of flow of displaced air and dust. These large flow rates are common, for example, when a vehicle is unloaded by tilting the bed of the vehicle upwardly and opening the entire rear wall or tailgate of the vehicle. Since the outlet of the vehicle is the entire rear wall or tailgate of the vehicle, the flow rate of material from the vehicle is relatively large in comparison to the flow rate through a smaller outlet or opening in a wall of the vehicle.

Another dust reducing mechanism is described in detail in U.S. Pat. No. 5,544,686, hereby incorporated by reference entirely. That invention provides a number of metering units positioned across the opening in the top of the receiving pit. The metering units include louvers that have open and closed positions. The metering units also include a sensor which senses the presence of the grain on the closed louvers. After the sensor senses the presence of grain on the closed louvers, a timer will open the louvers after a predetermined delay. The delay in opening the louvers allows a pile of grain to accumulate on top of the louvers before the louvers open. The quantity of grain on top of the louvers is greater than can pass through the louvers at one time. Therefore, when the louvers are opened, grain will begin falling through the louvers but some of the pile will remain above the louvers. When the louvers are opened via the sensor, enough grain will have accumulated on top of the louvers to establish a choke load in the metering unit that is sufficient to block any air from rising up through the louvers as the choke load of grain passes by the louvers. The quantity of grain passing through the louvers is sufficient to generally fill the entire opening of the louvers, and therefore dust within the receiving pit will be blocked from rising up through the open louvers. This device operates well when the sensor operates properly and the flow rate of grain from a vehicle is relatively low, such as when the grain is dumped from the vehicle through a relatively small outlet.

However, when the sensor malfunctions or the grain is dumped at a relatively large flow rate, such as when the entire tailgate of the vehicle is opened and the bed of the vehicle is tilted up to unload the vehicle, such a device will cause a very large pile of grain to accumulate above the louvers. The metering units only allow grain through the louvers at a certain flow rate. When the flow rate out of the vehicle greatly exceeds the maximum flow rate that can pass through the louvers, a relatively large pile of grain will accumulate on top of the metering units. The vehicle may be emptied at such a quick rate that the resulting pile would be wider than the opening in the top of the receiving pit. This would require manually shoveling or sweeping the grain back on top of the receiving pit. A pit with a large enough opening and with enough metering units to accommodate such high flow rates resulting from dumping a large vehicle with the entire tailgate open is impractical.

Other designs for similar devices are shown in U.S. Pat. Nos. 5,893,399; 6,050,767; 6,156,087; 6,174,121 and 6,471,100, each of which is hereby incorporated by reference entirely.

It is therefore desirable to provide a cost efficient and effective mechanism for reducing the amount of dust emitted from a receiving pit when the grain or other material is being dumped at relatively high flow rates such as when grain is dumped from a vehicle with the entire tailgate open and the vehicle bed tilted up. Further, such a mechanism should reduce emissions of dust during both high and low flow rate modes of operation. Moreover, such a mechanism should be adapted for use with dust reduction mechanisms utilizing metering units as described above.

SUMMARY OF THE INVENTION

These and other objectives have been achieved by this invention, which in one embodiment is a dust control device for use with a receiving pit, and, in another embodiment is a method of controlling the dust emitted from the receiving pit when grain or other material is dumped therein. Advantageously, the dust control device of this invention is readily installed in an existing receiving pit and grid assembly as a retrofit to such an installation. Alternatively, this invention can be installed as original equipment with a new receiving pit and grid installation.

In one embodiment, this invention includes a dust control device for use with a grid covering a receiving pit. The receiving pit is adapted to accept material such as grain or any other particulate material deposited through the grid. Therefore, while grain is conveniently referred to herein as the material being deposited into the receiving pit, this invention is not limited to use with any particular material or granular/particulate substance.

The grid including a series of generally parallel and spaced bars oriented perpendicularly to a series of spaced support beams atop the uppermost opening of the receiving pit. The dust control device according to one embodiment of this invention includes a number of flights each adapted to be positioned beneath the grid and between an adjacent pair of the support beams. The material is deposited atop the flights after passing through the bars and between the beams of the grid. The dust control device also includes a number of generally vertically extending bulkheads each adapted to be positioned beneath the grid and juxtaposed to a free end of one of the flights to thereby inhibit the escape of dust from the receiving pit. Each flight includes a series of blades capable of independently deflecting in response to an amount of material deposited through the grid and onto the blade. Each blade overlaps an adjacent blade in the associated flight and is biased into contact with the respective bulkhead proximate a free end of the blade.

The dust control device also includes a release mechanism coupled to each of the flights to manually deflect at least selected blades and allow material remaining atop the blade to fall into the receiving pit. Therefore, as a result of the dust control device of this invention, dust emitted from the receiving pit is blocked by the flights of blades and associated bulkheads from escaping the receiving pit irrespective of the flow rate of material being deposited through the grid and into the pit.

BRIEF DESCRIPTION OF THE DRAWINGS

The objectives and features of the invention will become more readily apparent from the following detailed description taken in conjunction with the accompanying drawings in which.

DESCRIPTION OF THE INVENTION

Figure 1:
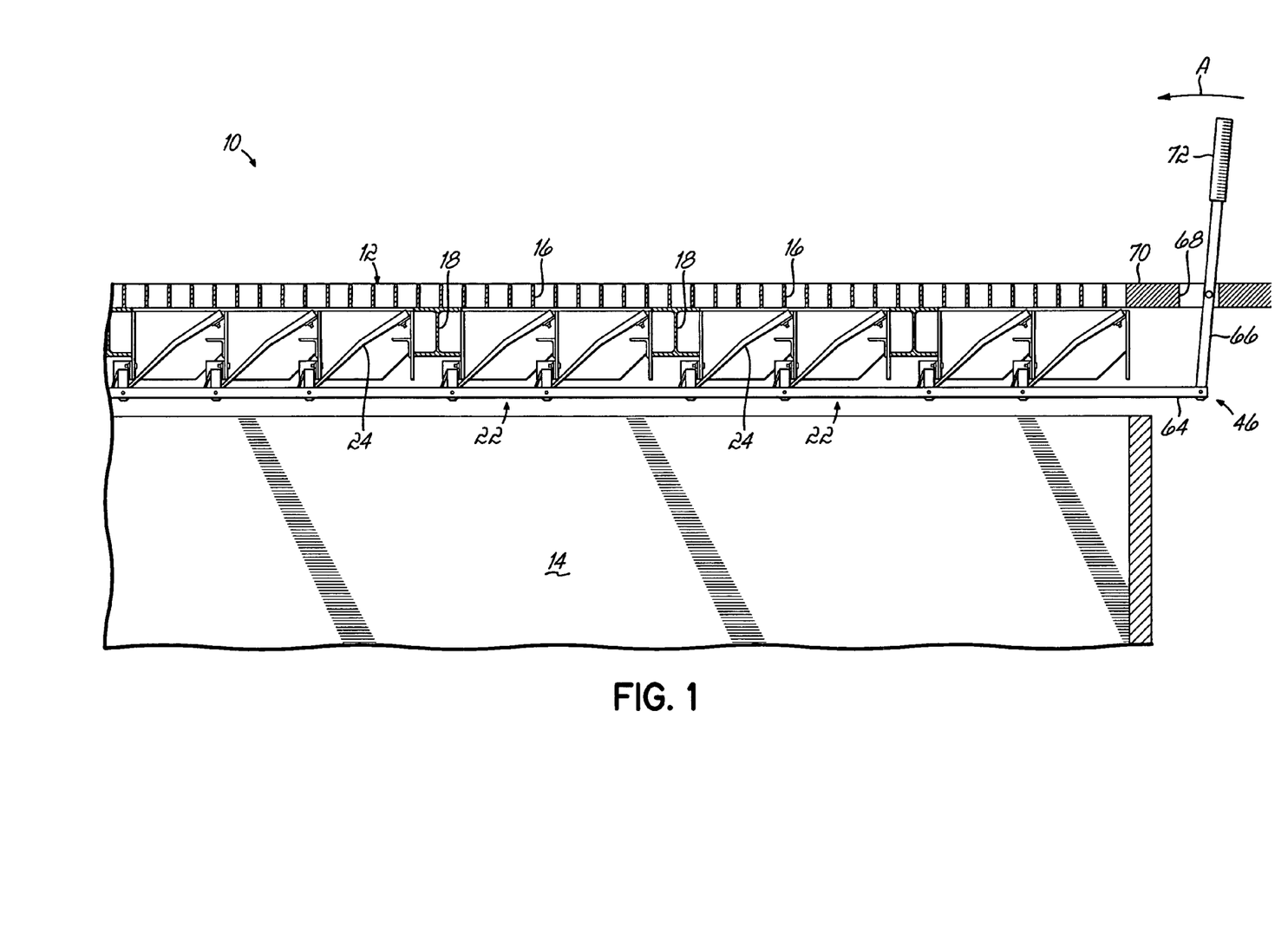
FIG. 1 is a side elevational view in partial cross-section showing one embodiment of dust control device installed beneath a grid covering a receiving pit according to this invention.

Referring to FIG. 1, an exemplary dust control device according to one embodiment of this invention is shown generally as 10. The dust control device 10 is mounted beneath a grated floor or grid 12 covering a receiving pit or a hopper 14. The grid 12 includes a series of generally parallel, spaced bars 16 which are mounted atop longitudinal I-beams 18. The series of transverse grating bars 16 are welded across an upper surface of the longitudinal I-beams 18. The grid floor structure 12 is designed so that a grain car, truck, vehicle or the like (not shown) can drive over the bars 16 and dump its load which may include corn, grain, sugar, coal, sand, wood chips or any other material 20, particulate, granular or otherwise. The material 20 passes through the grated floor structure 12 toward one or more hoppers or receiving pits 14 located beneath the grid floor structure 12.

The dust control device 10 according to one embodiment of this invention includes a series of flights 22 of blades 24 mounted beneath the spaced bars of the grid floor structure 12 and between the support beams 16. As shown generally in FIG. 1, the gap between adjacent beams 16 of the grid floor structure 12 may have multiple flights 22 positioned therein. Because each flight 22 according to this embodiment of the dust control device 10 is substantially identical to each other flight 22, only one of the flights 22 will be described in detail herein.

Figure 2:
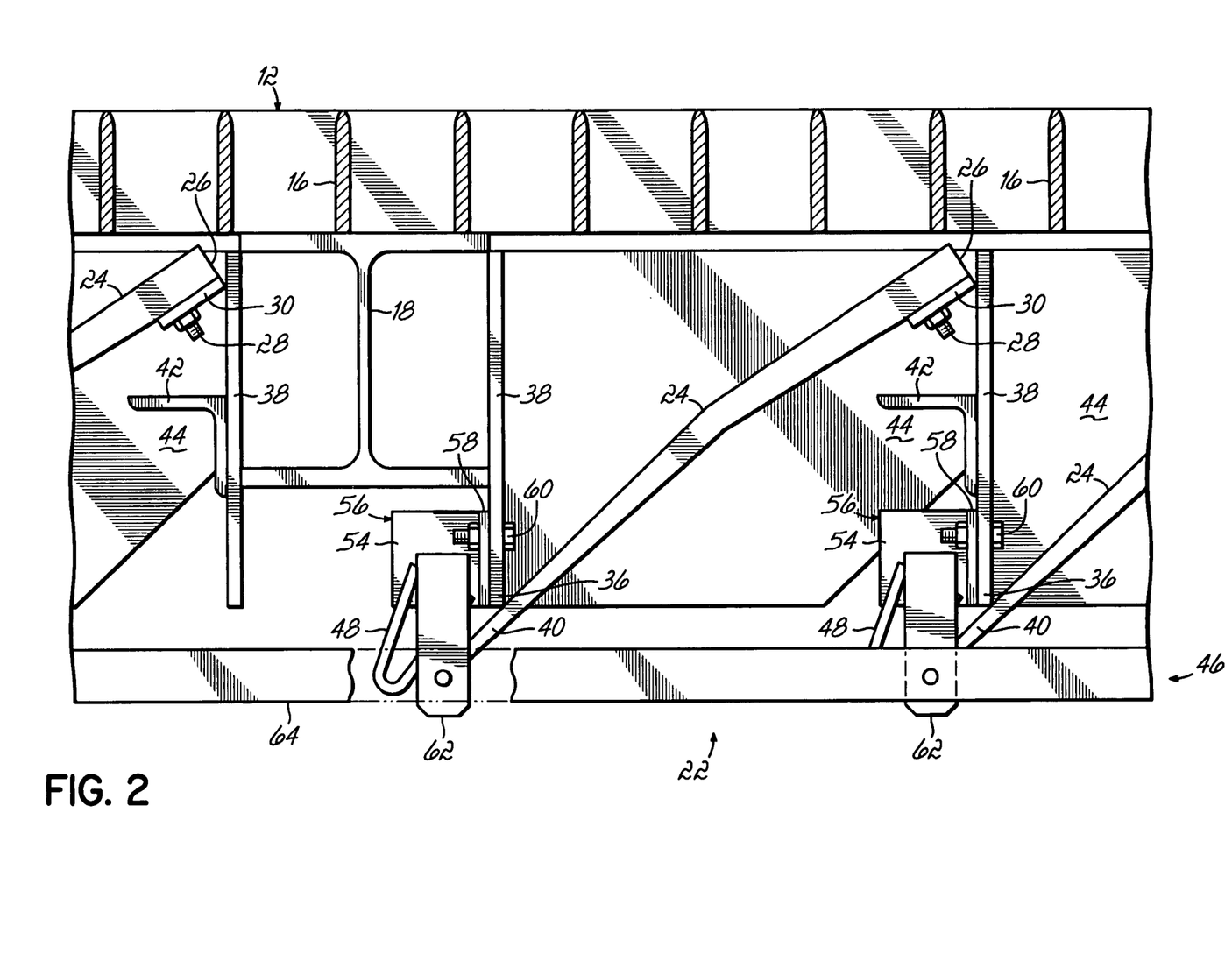
FIG. 2 is an enlarged view of a portion of the dust control device shown in FIG. 1.

As shown in FIGS. 1–2 and 5–8, each flight 22 includes a series of overlapping blades 24 mounted at a downwardly sloping angle beneath the spaced bars 16. An upper end 26 of each blade 24 is mounted by a bolt or other mechanical fastener 28 to an angled mounting plate 30 attached to an adjacent bulkhead 38 (FIG. 2). According to one embodiment, each blade 24 has a pair of mounting holes 32 through which a pair of the bolts 28 are inserted to secure the blade 24 to the mounting plate 30. A lower, free end 34 of each blade 24 opposite from the upper end 26 is juxtaposed to a lower edge 36 of a generally vertically extending plate or bulkhead 38. Preferably, a tail portion 40 of each blade 24 extends beyond the lower edge 36 of the plate/bulkhead 38 as shown in FIG. 2. Each bulkhead 38 to which a flight 22 and mounting plate 30 are mounted includes an L-shaped beam or spine 42 for added rigidity and support. A vertical baffle plate 44 oriented perpendicularly to the bulkhead 38 may be provided for each flight 22.

Figure 2A:
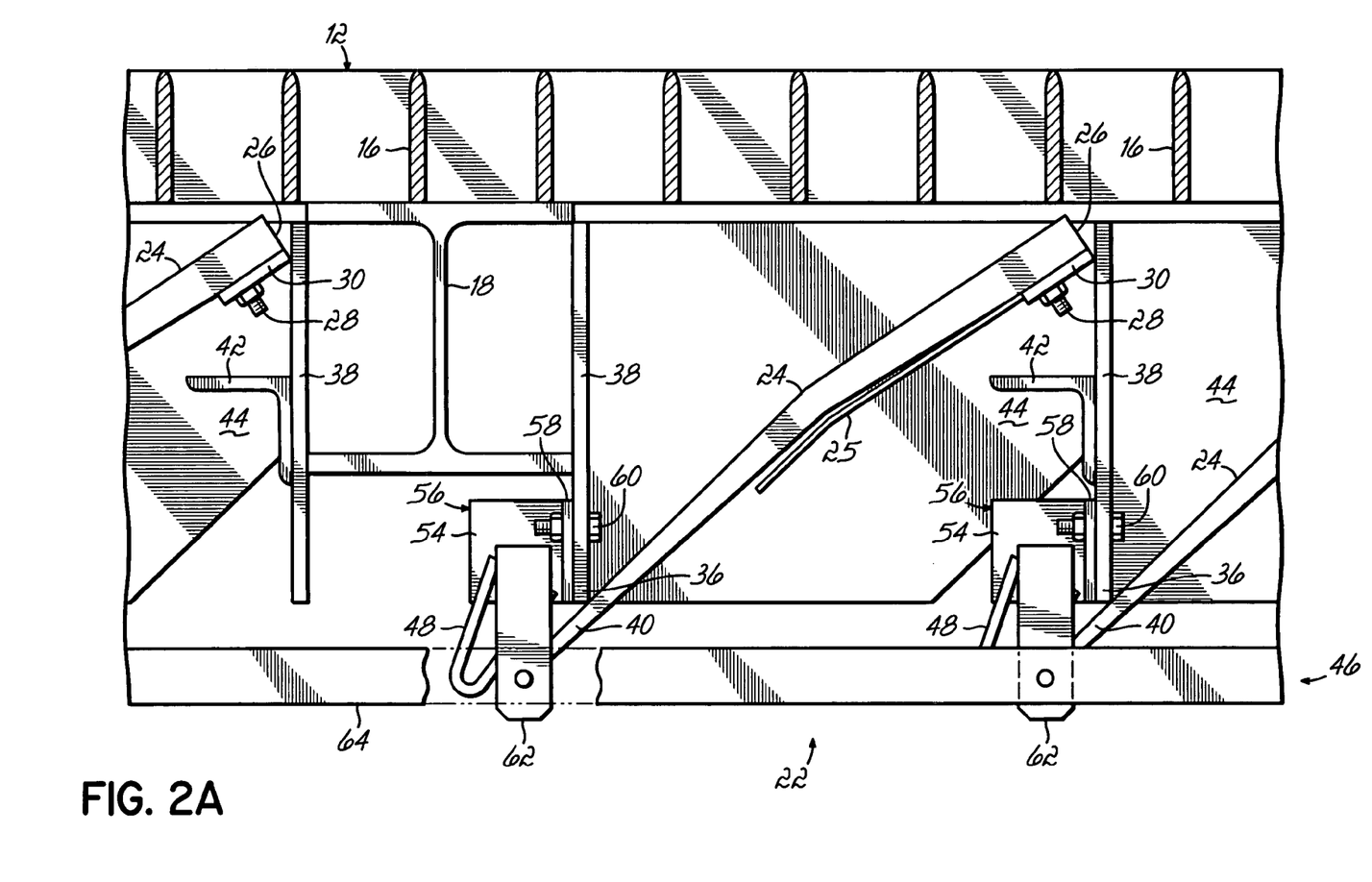
FIG. 2A is a view similar to FIG. 2 of an alternative embodiment of a portion of the dust control device.

Each blade 24 is preferably flexible, at least in part, and capable of deflecting in response to an amount of material 20 deposited through the grid 12 and onto the blade 24. As such, in one embodiment of this invention each blade 24 is made from urethane and biased into contact with the lower edge 36 of the associate bulkhead 38 as shown in FIG. 2. Therefore, the flights 22 and associated blades 24 in contact with the respective bulkheads 38 substantially seal the receiving pit 14 from the environment and thereby inhibit the escape of dust or other material upwardly from the pit 14 and through the grid 12. In an alternative embodiment shown in FIG. 2A, selected blades 24 have a brace 25, which may be made of flex steel or the like, under the blade 24 to bias and urge the blade 24 upwardly toward the closed position shown in FIG. 2.

Figure 3:
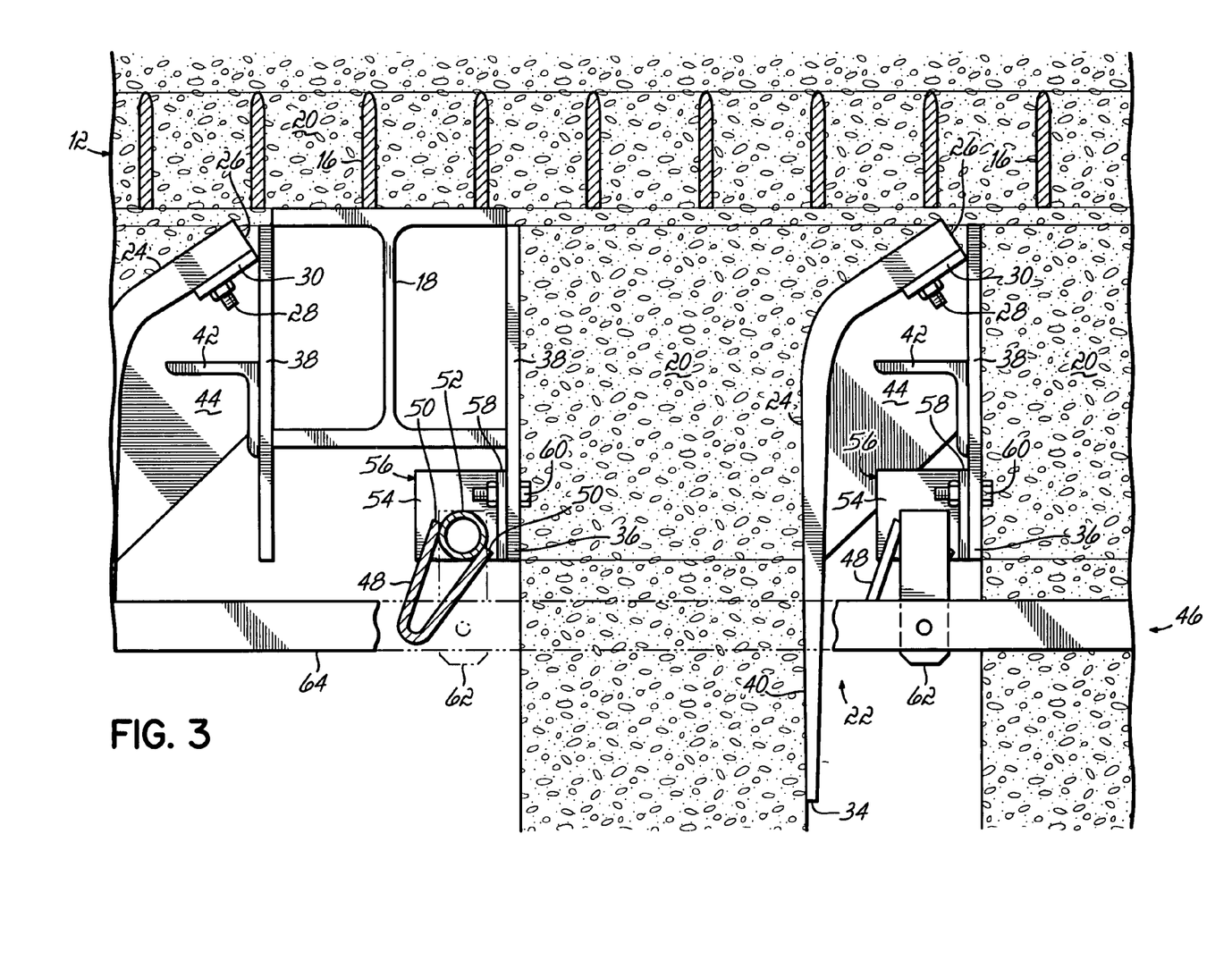
FIG. 3 is a view similar to FIG. 2 with selected blades of the dust control device being deflected by particulate material falling through the grid and into the receiving pit.

Material 20 is dumped through the grid 12 as shown in FIG. 3, and passes through the grid 12 and is deposited onto the blades 24. The weight of the material 20 deflects the blades 24 and the material 20 falls into the pit 14 there below. Irrespective of the flow rate of material 20 deposited through the grid 12 and onto the blades 24, the blades 24 deflect in response to the weight of the accumulated material 20. As will be appreciated by one ordinary skill in the art, the shape, configuration, material, and flexibility of the blades 24 can be adjusted based upon the anticipated flow rate, mass of material 20 and/or quantity of material 20 expected to be deposited through the grid 12 and into the pit 14.

When the material 20 is falling through the grid 12 and past the deflected blades 24, any dust generated by the movement of the material 20 is prevented from escaping from the pit 14 due to the downward flow of material 20. As the flow of material 20 through the grid 12 and past the blades 24 eases, the weight of material 20 on the blades 24 decreases until the blades 24 return to their original position of FIG. 2 with or without the assistance of the braces 25. With the blades 24 juxtaposed to the associated bulkhead 38, any dust generated by the flow of the material 20 into the pit 14 is prevented from escaping the pit 14.

Typically, an accumulation of material 20 will remain on top of the blades 24 once the blades 24 return to the closed position in contact with the associated bulkhead 38. As such, a release mechanism 46 is provided with the dust control device 10 of this invention. In one embodiment, the release mechanism 46 includes a series of release arms 48, at least one for each flight 22 and preferably multiple, spaced release arms 48 for each flight 22. Each release arm 48 is a generally V-shaped channel member with the free ends 50 of the release arm 48 welded or otherwise mounted to a circular pivot bar 52 (FIG. 3). The pivot bar 52 is mounted for pivotal and/or rotational movement to a projecting leg 54 of a generally L-shaped mounting plate 56 which is secured along a base leg 58 thereof by mechanical fasteners such as a bolt 60 or other similar device to the bulkhead 38. Preferably, the pivot bar 52 extends the entire length of the associated flight 22 and one or more release arms 48 are spaced along the flight 22 and mounted to the bar 52.

The pivot bar 52 is capped by a pivot link 62 which extends downwardly from the pivot bar 52 as shown in FIGS. 1–4. Each pivot link 62 is pinned to an elongate rod 64 which traverses the entire length of the receiving pit 14. Alternatively, while the rod 64 is shown as a unitary member it may be provided in individual segments for ease of installation. A lever 66 is pinned to a terminal end of the rod 64. The lever 66 projects upwardly through an opening 68 in the floor 70 to expose a handle 72. After the grain/material 20 is dumped through the grid 12 and past the deflecting blades 24 and into the pit 14, any grain or material 20 remaining atop the blades 24 is discharged from the blades 24 and into the pit 14 by operation of the release mechanism 46.

Figure 4:
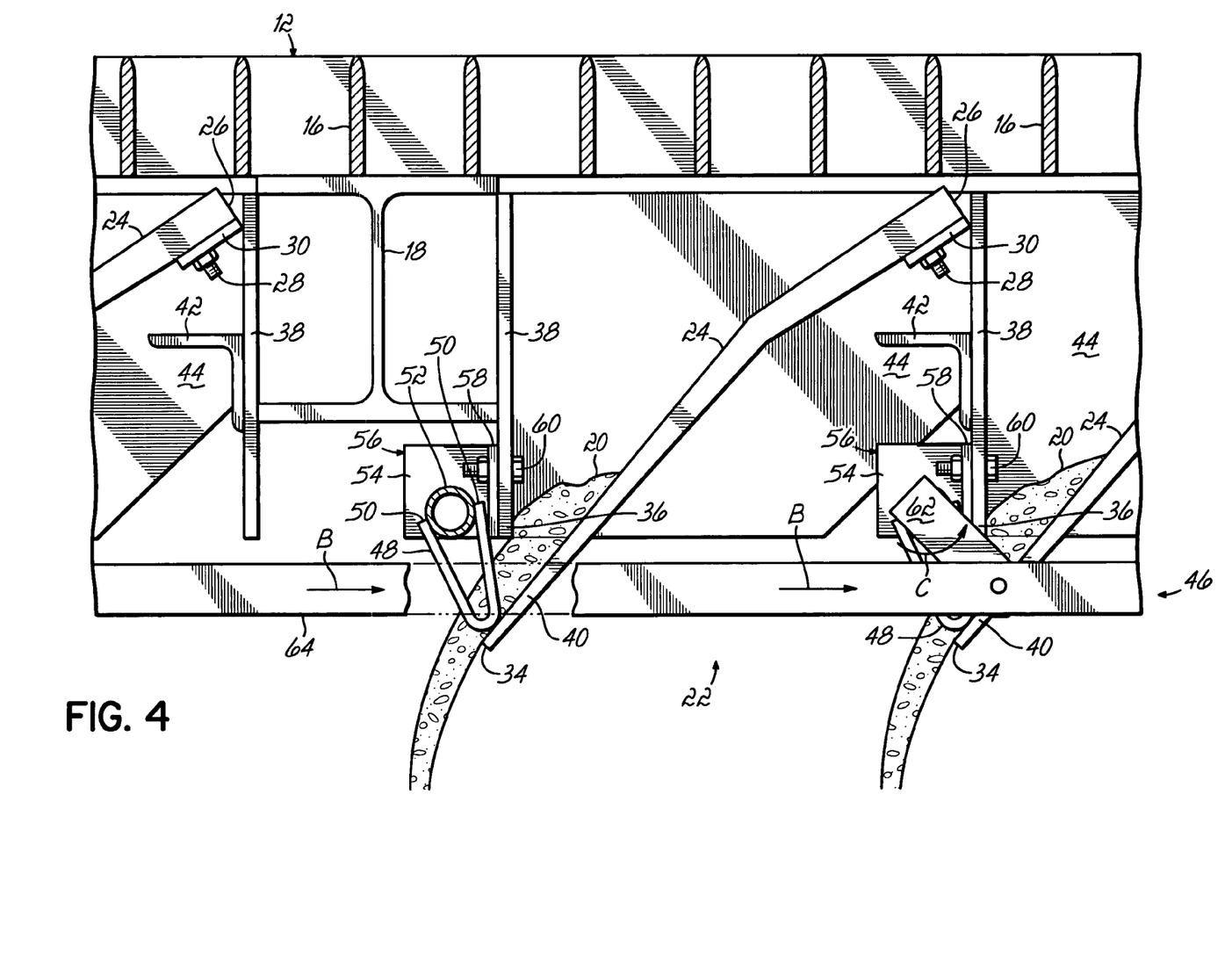
FIG. 4 is a view similar to FIG. 3 in which the blades are being manually deflected to allow any particulate material remaining atop the blades to fall into the receiving pit.
Figure 5:
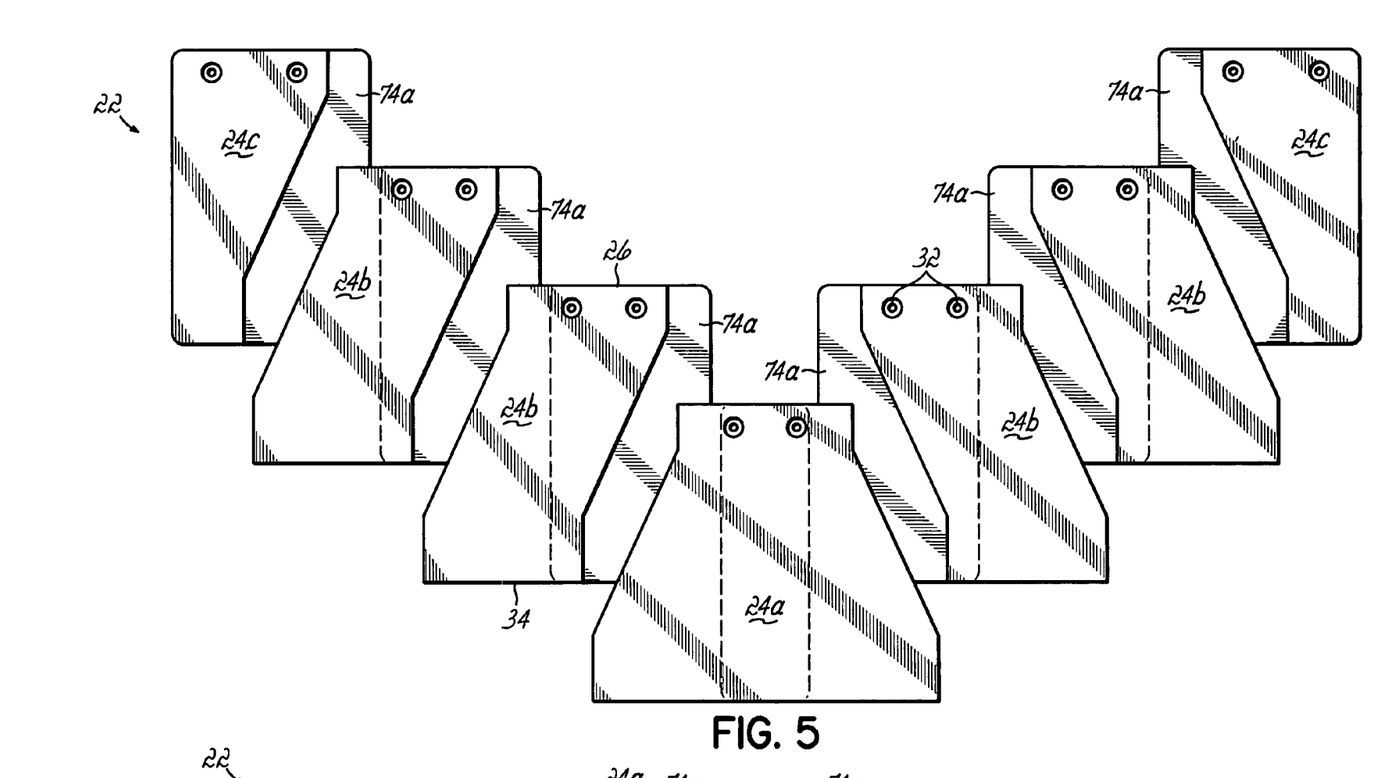
FIG. 5 is a top plan view of a number of spaced blades of a single flight of the dust control device of this invention in staggered arrangement.
Figure 6:
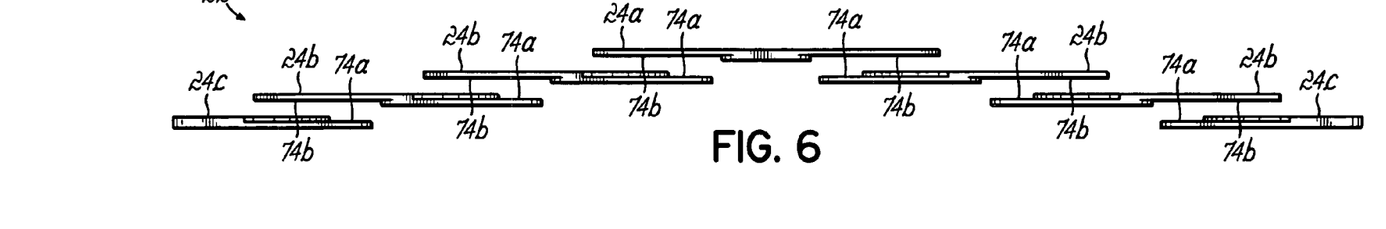
FIG. 6 is an end elevational view of the blades of FIG. 5.
Figure 7:
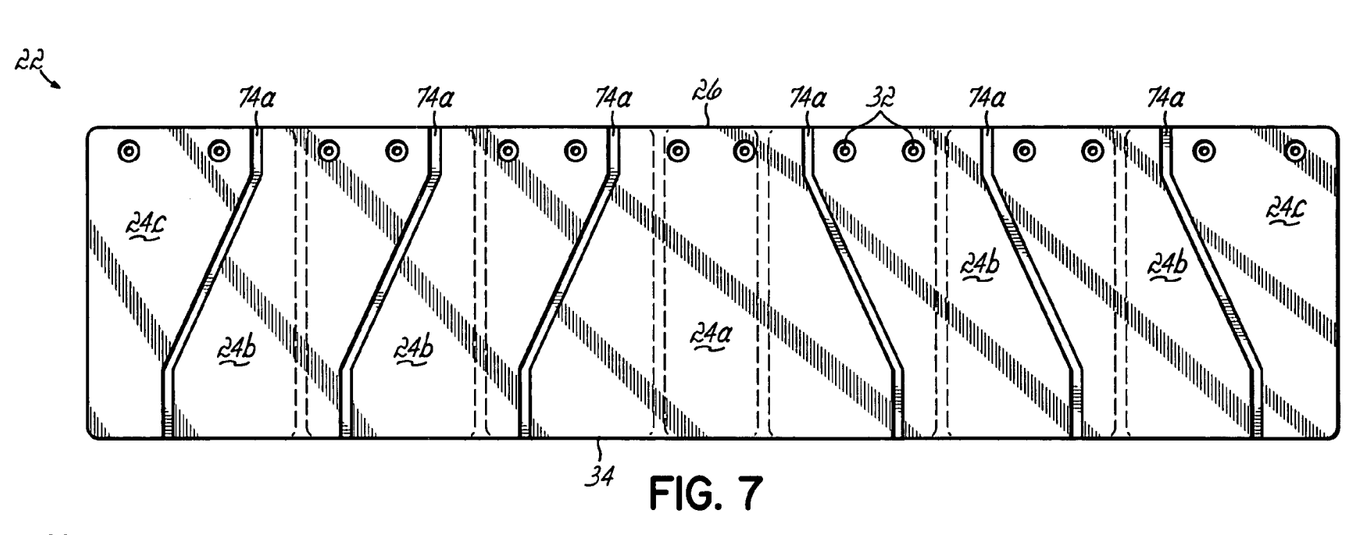
FIG. 7 is a top plan view of the blades of a single flight of the dust control device of this invention in an overlapping, assembled configuration.
Figure 8:
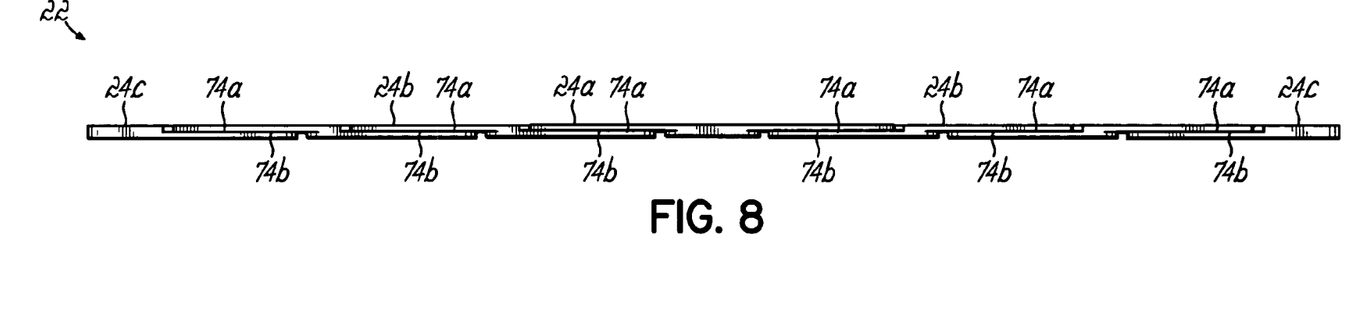
FIG. 8 is an end elevational view of the blades of FIG. 7.

Specifically, a user pivots the handle 72 in the direction of arrow A in FIG. 1 to thereby translate the rod 64 in the direction of arrow B in FIG. 4. Movement of the rod 64 in the direction of arrow B thereby pivots the pivot links 62 in the direction of arrow C of FIG. 4. Pivotal movement of the links 62 likewise pivots the pivot bar 52 and the release arms 48 mounted thereto. As the release arms 48 pivot in the direction of arrow B they contact the tail portions 40 of the blades 24 thereby deflecting them away from the bulkhead 38 to permit any remaining grain or other material 20 supported on the blades 24 to pass between the bulkhead 38 and the deflected blades 24 without allowing dust to escape from the receiving pit 14. Once all the material 20 has fallen from the blades 24, the user returns the handle 72 to its original position and permits the release mechanism 46 to return the blades 24 to their contact position with the associate bulkhead 38.

In one embodiment, each flight of blades 24 is arranged and configured as shown in FIGS. 5–8. Specifically, each blade 24 overlaps with the adjacent blade 24 with a center blade 24a overlapping a recessed portion 74 of each adjacent blade 24 and so on as seen in FIGS. 5–8. The blades 24 of each flight 22 are generally symmetric about an axis bisecting the center blade 24a. Each intermediate blade 24b includes both an upper and lower recessed portion 74a, 74b for overlapping an adjacent blade 24 on each side thereof. The center blade 24a has a pair of spaced lower recessed portions 74b and each outboard blade 24c has only an upper recessed portion 74a. The blades 24b, 24c on the left hand side of the flight 22 are mirror images of the blades 24b, 24c on the right hand side of the flight. Preferably, each recessed portion 74a, 74b has a stepped configuration as shown in FIGS. 5–8. The blade 24 configuration and arrangement as shown and described herein provides the advantage that deflection of the center blade 24a tends to deflect each of the other blades 24b, 24c in a cascading arrangement to efficiently and quickly allow the material 20 to flow off of the blades 24 and into the pit 14 without generating an excessive amount of dust or a large accumulation of material 20 on the blades 24. Nevertheless, other blade configurations, designs, materials or arrangements are readily within the scope of this invention.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A dust control device for use with a grid covering a receiving pit adapted to accept material deposited through the grid, the grid including a series of generally parallel and spaced bars oriented perpendicularly to a series of spaced support beams, the dust control device comprising:
   a plurality of flights each adapted to be positioned beneath the grid and between an adjacent pair of the support beams, the material being deposited atop the flights after passing through the grid;
   a plurality of generally vertically extending bulkheads each adapted to be positioned beneath the grid and juxtaposed to a free end of one of the flights to thereby inhibit the escape of dust from the receiving pit;
   wherein each flight includes a plurality of blades capable of deflecting in response to an amount of material deposited through the grid and onto the blade; and
   wherein selected blades overlap an adjacent blade in the associated flight and are biased into contact with the respective bulkhead proximate the free end of the blade.

2. The device of claim 1 further comprising:
   a release mechanism coupled to each of the flights to manually deflect at least selected blades and allow material remaining atop the blade to fall into the receiving pit.

3. The device of claim 1 wherein each of the flights is oriented at a downward angle to promote the flow of material thereon off of the flights.

4. The device of claim 1 wherein selected blades are biased upwardly into contact with the associated bulkhead to thereby inhibit the escape of dust from the receiving pit.

5. The device of claim 1 further comprising:
   a plurality of braces each juxtaposed to one of the blades to thereby bias the associated blade into contact with the associated bulkhead.

6. The device of claim 1 further comprising:
a plurality of generally vertically oriented baffles each adapted to be mounted beneath the grid and generally perpendicularly to the bulkheads to control the flow of dust in the receiving pit.

7. The device of claim 1 wherein each of the flights are generally parallel with one another.

8. The device of claim 1 wherein each of the blades are independently flexible.

9. The device of claim 1 wherein each of the flights are independently deflectable.

10. A receiving pit comprising:
a hopper adapted to accept material deposited therein through an upper opening;
a grid covering the upper opening and including a plurality of generally parallel and spaced bars oriented perpendicularly to a plurality of spaced support beams;
a dust control device mounted relative to the grid, the dust control device comprising,
(a) a plurality of flights each positioned beneath the grid and between an adjacent pair of the support beams, the material being deposited atop the flights after passing through the grid; and
(b) a plurality of generally vertically extending bulkheads each mounted beneath the grid and juxtaposed to a free end of one of the flights to thereby inhibit the escape of dust from the hopper;
wherein each flight includes a plurality of blades capable of deflecting in response to an amount of material deposited through the grid and onto the blade to allow the material to fall into the hopper; and
wherein selected blades overlap an adjacent blade in the associated flight and are biased into contact with the respective bulkhead proximate the free end of the blade.

11. The receiving pit of claim 10 further comprising:
a release mechanism coupled to each of the flights to manually deflect at least selected blades and allow material remaining atop the blade to fall into the receiving pit.

12. The receiving pit of claim 10 wherein each of the flights is oriented at a downward angle to promote the flow of material thereon off of the flights.

13. The receiving pit of claim 10 further comprising:
a plurality of braces each juxtaposed to one of the blades to thereby bias the associated blade into contact with the associated bulkhead.

14. The receiving pit of claim 10 further comprising:
a plurality of generally vertically oriented baffles mounted beneath the grid and generally perpendicularly to the bulkheads to control the flow of dust in the receiving pit.

15. The receiving pit of claim 10 wherein each of the flights are generally parallel with one another.

16. The receiving pit of claim 10 wherein each of the blades are independently flexible.

17. The receiving pit of claim 10 wherein each of the flights are independently deflectable.

18. A dust control device for use with a grid covering a receiving pit adapted to accept material deposited through the grid, the grid including a series of generally parallel and spaced bars oriented perpendicularly to a series of spaced support beams, the dust control device comprising:
a plurality of generally parallel flights each adapted to be positioned beneath the grid in a downwardly sloping orientation and between an adjacent pair of the support beams, the material being deposited atop the flights after passing through the grid, each of the flights being independently deflectable;
a plurality of generally vertically extending bulkheads each adapted to be positioned beneath the grid and juxtaposed to a free end of one of the flights to thereby inhibit the escape of dust from the receiving pit;
wherein each flight includes a plurality of blades capable of deflecting in response to an amount of material deposited through the grid and onto the blade;
wherein selected blades overlap an adjacent blade in the associated flight and are biased into contact with the respective bulkhead proximate the free end of the blade;
a plurality of generally vertically oriented baffles adapted to be mounted beneath the grid and generally perpendicularly to the bulkheads to control the flow of dust in the receiving pit; and
a release mechanism coupled to each of the flights to manually deflect the associated flight and allow material remaining atop the blade to fall into the receiving pit.

19. A dust control device for use with a grid covering a receiving pit adapted to accept material deposited through the grid, the grid including a series of generally parallel and spaced bars oriented perpendicularly to a series of spaced support beams, the dust control device comprising:
a plurality of flights each adapted to be positioned beneath the grid and between an adjacent pair of the support beams, the material being deposited atop the flights after passing through the grid;
a plurality of generally vertically extending bulkheads each adapted to be positioned beneath the grid and juxtaposed to a free end of one of the flights to thereby inhibit the escape of dust from the receiving pit;
wherein each flight includes a plurality of blades capable of deflecting in response to an amount of material deposited through the grid and onto the blade; and
wherein selected blades are biased upwardly into contact with the associated bulkhead to thereby inhibit the escape of dust from the receiving pit.

20. A dust control device for use with a grid covering a receiving pit adapted to accept material deposited through the grid, the grid including a series of generally parallel and spaced bars oriented perpendicularly to a series of spaced support beams, the dust control device comprising:
a plurality of flights each adapted to be positioned beneath the grid and between an adjacent pair of the support beams, the material being deposited atop the flights after passing through the grid;
a plurality of generally vertically extending bulkheads each adapted to be positioned beneath the grid and juxtaposed to a free end of one of the flights to thereby inhibit the escape of dust from the receiving pit;
wherein each flight includes a plurality of blades capable of deflecting in response to an amount of material deposited through the grid and onto the blade; and
a plurality of braces each juxtaposed to one of the blades to thereby bias the associated blade into contact with the associated bulkhead.

21. A receiving pit comprising:
a hopper adapted to accept material deposited therein through an upper opening;
a grid covering the upper opening and including a plurality of generally parallel and spaced bars oriented perpendicularly to a plurality of spaced support beams;

a dust control device mounted relative to the grid, the dust control device comprising,
(a) a plurality of flights each positioned beneath the grid and between an adjacent pair of the support beams, the material being deposited atop the flights after passing through the grid; and
(b) a plurality of generally vertically extending bulkheads each mounted beneath the grid and juxtaposed to a free end of one of the flights to thereby inhibit the escape of dust from the hopper;

wherein each flight includes a plurality of blades capable of deflecting in response to an amount of material deposited through the grid and onto the blade to allow the material to fall into the hopper; and a plurality of braces each juxtaposed to one of the blades to thereby bias the associated blade into contact with the associated bulkhead.

* * * * *